United States Patent [19]
Nanba et al.

[11] 3,936,842
[45] Feb. 3, 1976

[54] AUTOMATIC EXPOSURE TIME CONTROL CIRCUITRY FOR A CAMERA USING A PHOTODIODE AS A LIGHT MEASURING ELEMENT

[75] Inventors: Yasuhiro Nanba, Sakai; Motonobu Matsuda, Izumi, both of Japan

[73] Assignee: Minolta Camera Kabushiki Kaisha, Osaka, Japan

[22] Filed: June 21, 1974

[21] Appl. No.: 481,811

[30] Foreign Application Priority Data
June 23, 1973  Japan.................... 48-70465

[52] U.S. Cl. ............... 354/24; 354/50; 354/51; 354/60 E
[51] Int. Cl.² ................... G03B 7/08; G01J 1/44
[58] Field of Search ............. 354/24, 50, 51, 60 R

[56] References Cited
UNITED STATES PATENTS

| | | | |
|---|---|---|---|
| 3,625,124 | 12/1971 | Miyakawa | 354/24 |
| 3,670,637 | 6/1972 | Mori et al. | 354/24 |
| 3,679,905 | 7/1972 | Watanabe | 354/24 |
| 3,712,192 | 1/1973 | Ono et al. | 354/24 |
| 3,736,851 | 6/1973 | Ono et al. | 354/24 |
| 3,781,551 | 12/1973 | Mori | 354/24 |
| 3,827,066 | 7/1974 | Yanagisawa et al. | 354/51 |
| 3,852,774 | 12/1974 | Taguchi et al. | 354/24 |
| 3,877,039 | 4/1975 | Ichinohe et al. | 354/24 |

Primary Examiner—L. T. Hix
Assistant Examiner—Russell E. Adams, Jr.
Attorney, Agent, or Firm—Watson, Cole, Grindle & Watson

[57] ABSTRACT

A light measuring circuit for an exposure time control device uses a photodiode to measure the object brightness and a logarithmic compressing diode to provide negative feedback between the output terminal and one input terminal of a differential amplifying circuit. The output of the light measuring circuit is summed with signals representing film sensitivity and diaphragm aperture setting and the resulting exposure time control signal is compensated for changes in temperature. An antilogarithmic converting circuit generates a signal proportional to the logarithmic value of the compensated exposure time control signal. The antilogarithmic converting circuit operates at the same reference potential as the differential amplifying circuit and its output is integrated and then used to terminate exposure.

6 Claims, 4 Drawing Figures

AUTOMATIC EXPOSURE TIME CONTROL CIRCUITRY FOR A CAMERA USING A PHOTODIODE AS A LIGHT MEASURING ELEMENT

BACKGROUND OF THE INVENTION

This invention relates to automatic exposure time control devices using a photodiode as a light measuring element and, more particularly, to an automatic exposure time control device for a single reflex camera, wherein a photodiode receives scene light projected through an objective lens, produces a light measuring output voltage proportional to the logarithmic value of the object brightness, and then the output voltage is stored, and then logarithmically converted during exposure to thereby control the exposure time.

It is known that a photodiode is a better light measuring element as compared with a photoconductive element. As a light measuring element, it is necessary that the scene light projected through an objective lens be measured, then an electric current proportional to the brightness thereof be converted into a voltage proportional to that electric current by means of a logarithmic compressing diode, and that voltage be stored in a capacitor. The logarithmic compressing diode has a temperature characteristic and thus temperature-compensation commensurate with the diode temperature characteristic is required.

OBJECTS OF THE INVENTION

It is an object of the present invention to provide an improved exposure time control circuit which incorporates a photodiode as a light measuring element.

It is a further object of the present invention to provide a highly accurate circuit for use in an exposure time control device, which circuit maintains stable operation with power source voltage fluctuations and variations in ambient temperature.

It is a yet further object of the present invention to provide an exposure time control circuit which is insusceptible to external noise.

It is a still further object of the present invention to provide an exposure time control circuit which provides a wide dynamic range for the range of brightness of photographic objects.

SUMMARY OF THE INVENTION

According to the present invention, in an exposure time control circuit a photodiode is connected as a light measuring element between the input terminals of a field effect transistor (FET) input differential amplifying circuit. A light measuring circuit uses negative feedback between the differential amplifier input and output terminals generated by a diode for logarithmically compressing the output current from the photodiode. An operational circuit adds to the light measuring circuit output voltage a signal representative of the film sensitivity and a voltage commensurate with the diaphragm aperture to be adjusted upon exposure to obtain a summed voltage for exposure time control. The aforesaid operational circuit has a linear potentiometer and a sliding element adapted to slide commensurate with the diaphragm aperture to be adjusted upon exposure, as well as with respect to the film sensitivity used. The potentiometer is connected to a current source circuit supplying a current proportional to the absolute temperature, whereby the voltage produced between the sliding element and potentiometer is added to the output voltage from the light measuring circuit. The added output voltage is stored in a storage means prior to exposure, and the stored voltage is antilogarithmically converted into an electric current upon exposure by a transistor. The exposure is controlled by the converted current through an electromagnet. The other input terminal of the differential amplifying circuit is connected to the emitter of the antilogarithmic converting transistor at a reference potential.

The electric current source compensates for the temperature characteristic of the logarithmic compressing diode and adds the diaphragm aperture exposure setting, and the film sensitivity to the light measuring output voltage to thereby obtain a voltage for exposure control which is free of errors caused by changes in ambient temperature.

The photoelectric current produced in a photodiode is extremely low, such as several PAs (pico-ampere) for low brightness photographic objects. It follows that the input impedance of a circuit operating with such a low current should be substantially high. To this end, according to the present invention, field effect transistors having a high impedance are used as input transistors for a differential amplifying circuit. However, if the input impedance is high, consideration should be given to external noise.

According to the present invention, the amplifier input terminal which is not connected to the negative feedback is connected to the emitter of the antilogarithmic converting transistor at a reference potential point, and the photodiode is connected between the reference point and the other input terminal. Thus, the photodiode is in the negative feedback network so as to maintain the voltage between the terminals of the photodiode substantially at zero volts, thus maintaining that input at the same reference potential. Accordingly, another feature of the operational circuit is that the introduction of noise from the differential amplifier input terminal may be removed.

A still further feature of the operational circuit is that the mutual signal reference potential provided between the exposure control signal voltage storage means and the antilogarithmic converting transistor, the current of which is controlled by the stored signal voltage, is brought to the same potential with the input potential of the light measuring circuit, such that external noise will not be introduced into the exposure time control signal through the differential amplifier input terminal.

According to the aforesaid features of the present invention, the high input impedance of the differential amplifying circuit operates with an extremely low input current which is produced commensurate with a photographic object of a low brightness in an attempt to prevent the influence of external noise, thereby enabling high accuracy exposure time control over the wide range of the brightness of photographic objects.

DETAILED DESCRIPTION OF THE INVENTION

Figure 1:
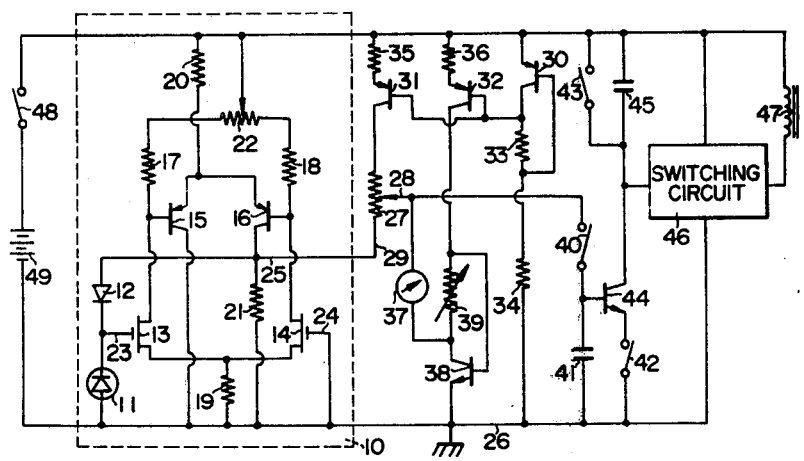
FIG. 1 is a schematic of an exposure time control circuit of the first embodiment of the present invention.

Referring now to FIG. 1, encompassed within a broken line is light measuring circuit 10 including: photodiode 11 adapted to convert into a photoelectric current the brightness of the light from a photographic object projected through an objective lens, compressing diode 12 which is a logarithmic converting element adapted to convert the photoelectric current into a voltage proportional to the logarithmic value thereof.

Field effect transistors 13, 14, transistors 15, 16, resistors 17, 18, 19, 20, 21 and variable resistor 22 in the light measuring circuit constitute a differential amplifying circuit. Gates 23, 24 of field effect transistors 13, 14 serve as high impedance input terminals, in the differential amplifying circuit, while junction 25 of the collector of transistor 16 with resistor 21 is an output terminal of the differential amplifying circuit.

Gate 24 of field effect transistor 14 is connected to ground terminal 26, while photodiode 11 is connected between ground terminal 26 and gate 23 of field effect transistor 13. Logarithmic compressing diode 12 is connected between input terminal 23 of the differential amplifying circuit and output terminal 25 thereof.

Linear potentiometer 27 is connected to output terminal 25 and sliding element 28 is positioned commensurate with the film sensitivity and the reset exposure diaphragm value, and produces a voltage commensurate with the aforesaid exposure information between sliding element 28 and terminal 29.

A circuit consisting of transistors 30, 31, 32 and resistors 33, 34, 35, 36 maintains the collector current of transistors 31, 32 constant, even if the power source voltage fluctuates, depending on the proper selection of the resistance of resistor 33. The aforesaid circuit is a current source circuit adapted to generate a current proportional to the absolute temperature at the collectors of transistors 31, 32. The proper selection of resistors 33, 34 and resistors 35, 36 or change in the emitter areas of transistors 30, 31, 32 provides a different current density flowing through the respective emitter layers of those transistors. Then there is provided a difference in the collector currents from transistors 30 and transistors 31, 32, with the base-emitter voltage of transistors 31, 32 being varied commensurate with the variation in the absolute temperature. Also, the collector currents from transistors 31, 32 are designed so as to be proportional to the absolute temperature by providing a potential difference across the respective base-emitter of transistor 30 and transistors 31, 32, namely the voltage across resistor 33.

Meter 37 indicates exposure time, while a circuit consisting of transistor 38 and variable resistor 39 compensates meter 37 for temperature changes. Switch 40 opens immediately before the commencement of rotation of a reflecting mirror in cooperation with a camera release mechanism, whereby the light measuring output (between terminals 25, 26), i.e., the voltage between terminal 28 and ground terminal 26 is stored in capacitor 41. Switch 42 is a trigger switch closed upon release of the shutter, while switch 43 is an electric discharging switch for integrating capacitor 45 and opened before the closure of trigger switch 42. Upon closure of trigger switch 42, transistor 44 produces a collector current proportional to the antilogarithm of the voltage stored in storing capacitor 41. Integrating condenser 45 is connected to the collector of transistor 44 and integrates the collector current, thus constituting a timing circuit.

Transistor switching circuit 46 is a known circuit which switches between ON-OFF conditions, i.e., the output condition, when the charging voltage of integrating condenser 45 reaches a given level, thereby actuating electromagnet 47. Electromagnet 47 releases a locked shutter closing member, due to the reversed output condition of switching circuit 46. When power source switch 48 is closed, the circuit according to the present invention is provided with current from power source 49.

When the light from a photographic object is incident on photodiode 11 through a photographic lens, then there is produced an electromotive force across both terminals thereof, and thus a photoelectric current flows from terminal 23 to ground terminal 26. Since the photoelectric current flows from the collector of transistor 16 (i.e., output terminal 25 of differential amplifying circuit) through logarithmic compressing diode 12, there is produced a voltage proportional to the logarithmic value of the photoelectric current across the terminals of logarithmic compressing diode 12. Accordingly, there will result a potential increased to an extent corresponding to the voltage produced across diode 12, as compared with that of input terminal 23.

Also, when the input potential at input terminal 23 is raised, the potential at the output terminal 25 of the differential amplifying circuit is lowered, such that the potential at input terminal 23 will be equal to the potential at ground terminal 26 as a result of the negative feedback action of diode 12, whereby a voltage across photodiode 11 may be maintained substantially at 0 volts. In other words, the photoelectric current from photodiode 11 will be a short-circuiting current (I short) including no dark current component, thus accommodating the brightness of a photographic object with a high accuracy. In addition, there will be obtained a voltage between output terminal 25 and ground terminal 26, which is proportional to the logarithmic value of the brightness of a photographic object with a high accuracy, i.e., a voltage which is logarithmically compressed. The relatively low resistance of resistor 21 connecting output terminal 25 to ground terminal 26 may be selected so that the potential at output terminal 25 will be sufficiently low for a dark photographic object.

Assuming that the photoelectric current of photodiode 11 is $I_p$, then the potential at output terminal 25, i.e., output voltage $V_P$, will be given according to the characteristics of logarithmic compressing diode 12, as follows:

$$V_P = \frac{kT}{q} \log \frac{IP}{I_s} \qquad (1)$$

, wherein $k$ represents Boltzmann's constant, T is the absolute temperature, $q$ is the electron charge, and $I_s$ will be approximately expressed as follows:

$$I_s = \alpha \, e^{-\phi/kT} \qquad (2)$$

wherein $\alpha$ represents a constant depending on the construction of photodiode 11, and $\phi$ represents a constant of about 1.2 ev, in the case of silicon. The collector current of transistor 31 may be made proportional to the absolute temperature by providing a difference in the temperature coefficient of the voltages across the base-emitters of transistors 30 and 31.

When an electric current $\beta$ T proportional to the absolute temperature flows through transistor 31 to a potentiometer set for the film sensitivity and preset diaphragm values, the voltage $V_E$ produced across terminals 28 and 29 will be given as follows:

$$V_E = nr\beta T \qquad (3)$$

wherein n represents a constant dependent on a combination of the film sensitivity with the preset diaphragm value, i.e., exposure information, r is the resistance of variable resistor 27 corresponding to the IEV of exposure information, and $\beta$ is a proportional constant.

Thus, the voltage $V_M$ at terminal 28, which is to be stored in the storing capacitor through closed switch 40 is the sum of the voltages given by the above formulae (1) and (3), if the current flowing to resistor 27 is sufficiently set to be lower than the current flowing from the collector of transistor 16 through resistor 21. In other words, $$V_M = V_P + V_E = \frac{kT}{q}\log \frac{I_p}{I_s} + nr\beta T \qquad (4)$$

The relationship of the voltage $V_{BE}$ across the base-emitter of antilogarithmic converting transistor 44 which is adapted to produce a current proportional to the antilogarithm of the stored voltage of formula (4) versus the collector current Ic is expressed as follows:

$$I_c = I_s' e^{\,\,qV_{BE}/kT} \qquad (5)$$

$$I_s' = \alpha' e^{-\phi/kT} \qquad (6)$$

wherein $\alpha'$ in the formula (6) is a constant depending on the construction of transistor 44.

If $V_{BE}$ in the formula (5) is substituted by the stored voltage $V_M$, then, $$I_c = \frac{I_c'}{I_s} I_p e^{nr\beta q/K}$$

$$I_c = \frac{\alpha'}{\alpha^x} I_p e^{nr\beta q/K} \qquad (7)$$

Thus, the term of temperature is eliminated, while the collector current $I_c$ of transistor 44 will be proportional to photoelectric current $I_p$ from photodiode 11 as well as to an index of the step number n dependent on the set exposure information.

As has been described above, the input potential at input terminal 24 of the differential amplifying circuit according to the present invention is maintained at the potential of ground terminal 26, whereby the differential amplifying circuit may be operated efficiently.

When the shutter is released, switch 42 will be closed, and then integrating condenser 45 will be charged by current $I_c$ shown in the formula (7). Then, when the voltage thus charged reaches a given level, switching circuit 46 will be operated, while electromagnet 47 is excited or operated in a reversed manner, whereupon the shutter will be closed immediately.

An electric current proportional to the absolute temperature will flow from the collector of transistor 32 through variable resistor 39 and the collector-emitter of transistor 38, while part of the aforesaid current will flow through the base-emitter of transistor 38. Variable resistor 39 adjusts the zero position of meter 37 by varying the resistance thereof when the light is not incident on photodiode 11. The actual and absolute base current $I_B$ of transistor 38 is lower as compared with the current flowing through variable resistor 39. Accordingly, the base current $I_B$ may be regarded as being constant with respect to temperature variations. Thus, the base-emitter voltage $V_{BE}$ of transistor 38 will be expressed as follows:

$$V_B'_E = \frac{kT}{q}\log \frac{I_B}{I_{Bs}} \qquad (8)$$

The above $I_{Bs}$ is similar to $I_s$ in the formula (2).

$$I_{Bs} = \alpha_B e^{-\phi/kT} \qquad (9)$$

wherein $\alpha_B$ represents a constant dependent on the construction of transistor 38.

Moreover, assuming that the resistance of variable resistor 39 is R, and a current flowing therethrough is $\beta_B T$ ($\beta_B$ is a proportional constant), then the voltage across variable resistor will be $R\beta_B T$. As a result, the voltage $V_c$ $_E$ across the collector-emitter of transistor 38 will be given as follows:

$$V_c'_E = \frac{kT}{q}\log \frac{I_B}{I_{Bs}} - R\beta_B T \qquad (10)$$

Accordingly, voltage $\Delta V$ across meter 37 will be the balance between the stored voltage $V_M$ in the formula (4) and voltage $V_c'$ $_E$.
$$\Delta V = V_M - V_c'_E$$

$$\Delta V = [\frac{k}{q}\log \frac{\alpha B'P}{\alpha' B} + (nr\beta + R\beta_B)] T \qquad (11)$$

The terms enclosed with the bracket in the above formula (11) include the brightness of a photographic object and exposure information and has no connection with temperature. Accordingly, if the resistance of the internal windings in meter 37 is provided with a temperature coefficient adapted to vary in proportion to the absolute temperature, then the current flowing through meter 37 may be made independent of temperature variations. A conventional copper wire may be used, whereby the resistance of the internal winding may be varied in proportion to the absolute temperature. The amount of current flowing through meter 37 is set so as to be less than that of the current flowing through variable resistors 27 and 39, thereby preventing the influence of the current flowing through meter 37 on an external circuit.

Figure 2:
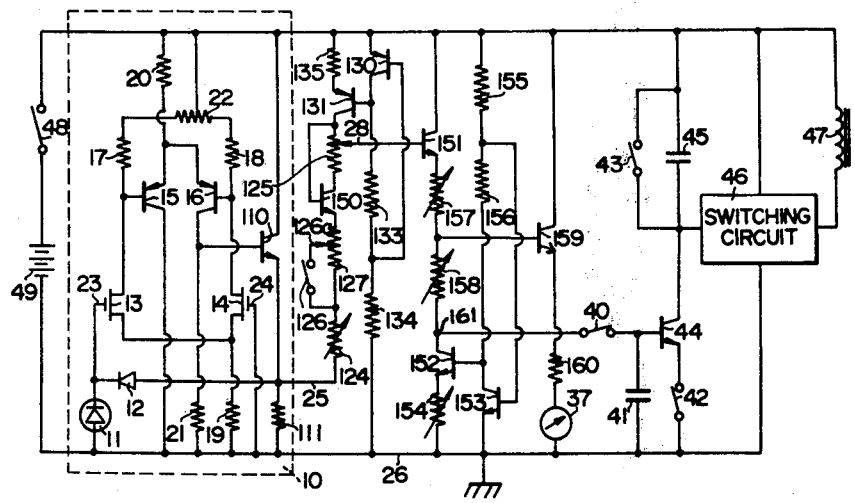
FIG. 2 is a schematic of an exposure time control circuit of the second embodiment of the present invention.

FIG. 2 shows an improvement over the electric control circuit described in the first embodiment and the same reference numerals identify the same components in the two Figures. Encompassed within the broken line is light measuring circuit 10, similar to the first embodiment in that it constitutes a differential circuit incorporating two field effect transistors 13 and 14, wherein the collector of transistor 16 is connected as an input to the base of transistor 110, while the output from light measuring circuit 10 is taken at the junction of the emitter of transistor 110 and resistor 111. In other words, output terminal 25 is connected to the emitter of transisitor 110, while resistor 111 is connected between output terminal 25 and ground 26. Compressing diode 12 is connected between the gate of FET 23 and the output terminal 25. Potentiometers 125 and 127 are adapted to set the diaphragm aperture setting which is to be adjusted upon exposure and the film sensitivity. Variable resistor 124 adjusts the potential output from potentiometer 127. Furthermore, switch 126 is connected to a circuit short-circuiting potentiometer 127 to sliding element 126a thereof and switches a fully opened diaphragmed light measurement to stopped-down light measurement. Thus, at the time of fully opened diaphragm measurement, switch 126 is maintained closed, with potentiometer 127 being used as a variable resistor. However, in the case of stoppeddown light measurement, switch 126 is maintained opened, with potentiometer 127 being used as a constant resistor. Transistor 150 compensates for the temperature characteristic of transistor 151. A circuit consisting of transistors 130, 131 and resistors 135, 133, 134 is a current source providing current proportional to the absolute temperature to the circuit connected to the collector of transistor 131.

A circuit consisting of transistors 152, 153, variable resistor 154 and resistors 155, 156 is a current source which provides a current proportional to the absolute temperature to the circuit connected to the collector of transistor 152. A circuit consisting of transistor 151 and variable resistors 157, 158 is a level shift circuit, wherein the level of the collector of transistor 152 is designed so as to be lower to an extent corresponding to the voltage drop in variable resistors 157 and 158 plus the voltage across the base-emitter of transistor 151 than the potential level of the base (output terminal 28) of transistor 151. A circuit consisting of transistor 159 and resistor 160 generates an exposure time control signal to meter 37 proportional to the exposure time to be controlled.

The voltage signal produced at output terminal 161 connected to the collector of transistor 152 is obtained by computing the logarithmic value of the brightness of a photographic object and the logarithmic values of the diaphragm aperture to be adjusted upon exposure as well as the film sensitivity. Thus, the aforesaid voltage signal is connected by switch 40 to charge storing capacitor 41. The remaining circuitry is the same as in the first embodiment.

The following description concerns the primary difference in the operation of the operational circuit from that of the first embodiment. The potential of the emitter of transistor 150 is higher than the potential of output terminal 25 of the light measuring circuit to an extent corresponding to the voltage drop due to the resistancecomponent between output terminal 25 and the emitter of transistor 150. In the case of fully opened diaphragm light measurement, the smaller the diaphragm is stopped down, the further the sliding element 126a of potentiometer 127 is moved towards the emitter side of transistor 150, such that the potential of the emitter of transistor 150 will be lowered to an extent corresponding to the number of steps the diaphragm is stopped down. The potential of sliding element 28 is lower than the potential of the terminal of potentiometer 125 connected to the base of transistor 151 by the voltage drop due to the resistance of potentiometer 125 therebetween, and the potential of the aforesaid terminal is higher to an extent corresponding to the voltage across the base-emitter of transistor 150.

The major portion of the collector current of transistor 131 flows through potentiometer 125, while the current flowing through the base of transistor 150 is negligibly low. The higher the film sensitivity, the further sliding element 28 shifts towards the collector side of transistor 131, and the higher will be the potential at sliding element 28.

The reason why a current proportional to the absolute temperature is provided to variable resistors 128, 127, 124 is the same as in the first embodiment.

Assuming that the temperature-dependent characteristic of the base-emitter of transistor 150 is not taken into consideration, the voltage between output terminal 25 of the light measuring circuit and sliding element 28 will serve as an exposure time control signal which has been produced by logarithmically compressing the brightness of a photographic object and then adding thereto the logarithmic values of the film sensitivity and diaphragm aperture to be adjusted upon exposure.

Then, the potential of the sliding element 28 is lowered due to the circuit consisting of transistor 151 and variable resistors 157, 158 for bringing in a suitable range the level of the aforesaid signal to be imparted between the base and emitter of antilogarithmic converting transistor 44. A current proportional to the absolute temperature is caused to flow through variable resistors 157, 158, and the voltage drop in both variable resistors 157, 158 is varied depending on temperature, as has been described previously, i.e., this is tantamount to an increase in the potential across variable resistor 124.

Further, the voltage across the base-emitter of transistor 151 varies depending on temperature, while this variation is off-set by the variation in voltage across the base-emitter of transistor 150 due to temperature variation. Accordingly, the signal produced at junction 161 between variable resistor 158 and transistor 152 is a voltage signal produced by adding the film sensitivity and the diaphragm aperture signals, with the signal level being suitably adjusted.

Also, variable resistors 157, 158 adjust the amount of the potential to be shifted, although variable resistors 157, 158 may be potentiometers or means for setting exposure information other than the brightness of the photographic object.

Figure 3:
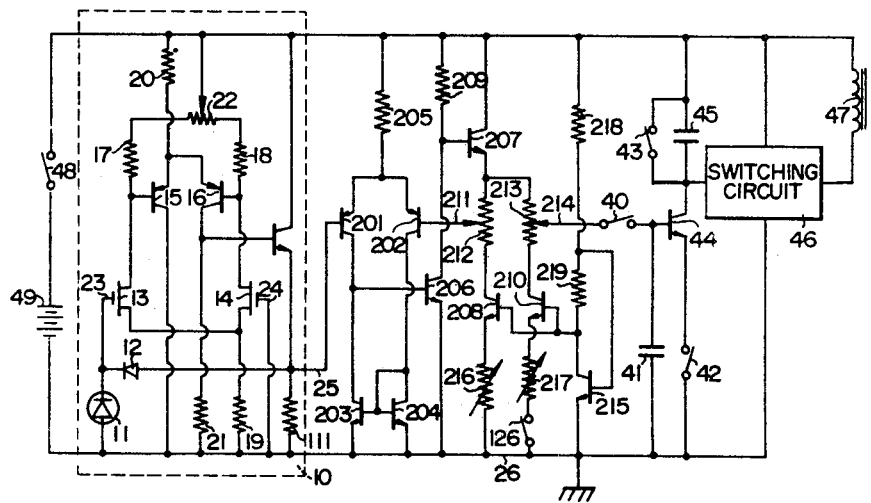
FIG. 3 is a schematic of an exposure time control circuit of the third embodiment of the present invention.

FIG. 3 shows the third embodiment of the present invention, with the light measuring circuit and antilogarithmic converting circuit the same as shown in FIG. 2. A circuit consisting of transistors 201, 202, 203, 204 and resistor 205 constitutes the second differential amplifying circuit, the bases of transistors 201, 202 serve as input terminals, and transistors 203, 204 serve as loads. A circuit consisting of transistors 207, 208 and resistor 209 constitutes an output circuit of the second differential amplifying circuit, and the output of the differential amplifying circuit is fed through transistor 206 to the emitter of transistor 207. Potentiometer 212 is connected between the emitter of transistor 207 and the collector of transistor 208, and potentiometer 213 is connected in parallel therewith between the aforesaid emitter and the collector of transistor 210. A circuit consisting of transistors 208, 210 and transistor 215 the collector of which is connected to the bases of transistors 208, 210, variable resistors 216, 217 and resistors 218, 219, is a current source circuit for generating a current proportional to the absolute temperature for a circuit connected to the collectors of transistors 208, 210.

In the operation of the aforesaid circuits, the second differential amplifying circuit, incorporating as input transistors transistors 201, 202, serves to transfer the signal voltage obtained at output terminal 25 of the light measuring circuit to a sliding element 211 of potentiometer 212. In other words, the direct connection of the sliding element to output terminal 25 will not permit computation with high accuracy, because the connection of sliding element 211 to output terminal 25 causes an electric current to flow into an output terminal through sliding element 211.

When the potential of output terminal 25 in the second differential amplifying circuit is increased, then the collector potential of transistor 203 will be lowered, such that the potential of the base and emitter of transistor 207 will be raised via transistor 206. This then causes the potential of sliding element 211 to be raised. In other words, the base of transistor 204 has a negative feedback via sliding element 211, such that the potential of the sliding element will follow the potential of output terminal 25, resulting in equalized potentials. However, the gain of the second differential amplifying circuit should be sufficiently large. Since the input impedance of the second differential amplifying circuit is sufficiently high, the current from output terminal 25, which has been provided through sliding element 211, may be rendered negligibly low. The light measuring output is reproduced at sliding element 211 with the above arrangement.

The potential at the junction between potentiometer 212 and the emitter of transistor 207 varies with the movement of sliding element 211. The extent of the voltage drop between the aforesaid junction and sliding element 211 may be used to represent film sensitivity. The higher the film sensitivity, the further sliding element 211 is moved towards the collector of transistor 208, such that the level of the aforesaid junction will be raised. The extent of the voltage drop between the emitter of transistor 207 and sliding element 214 of potentiometer 213 represents the diaphragm aperture to be adjusted, and thus the smaller the diaphragm aperture, the further sliding element 214 is moved towards the collector of transistor 210, such that the potential of sliding element 214 is lowered.

If light measurement is effected, with the diaphragm aperture to be adjusted being stopped down, switch 126 is opened as shown. In other words, when switch 126 is opened, there is no current flowing through potentiometer 213, while the potential of sliding element 214 will be equal to that of the emitter of transistor 207, and thus the information representative of the diaphragm aperture will not be computed. With the second embodiment shown in FIG. 2, switch 126 is positioned above ground potential 26, while in the case of the third embodiment shown in FIG. 3, one of the terminals of switch 126 is at the signal reference level, that is, ground potential.

Figure 4:
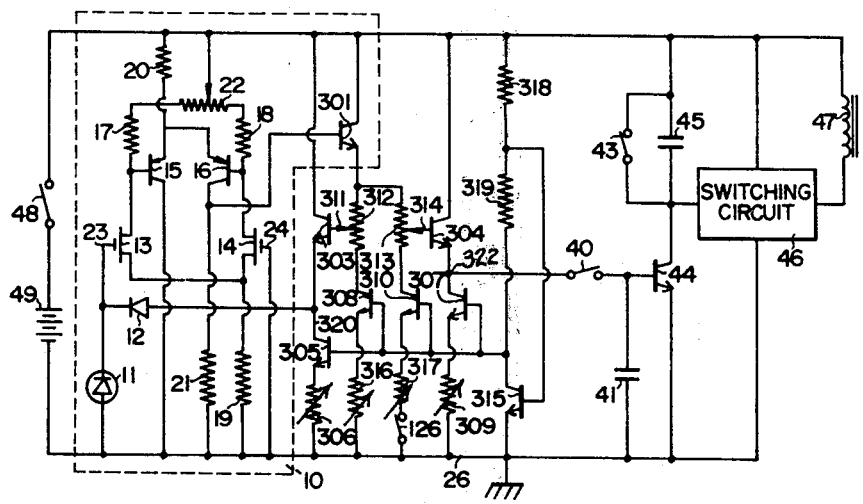
FIG. 4 is a schematic of an exposure time control circuit of the fourth embodiment of the present invention.

With the fourth embodiment shown in FIG. 4, the function of the second differential amplifying circuit in the third embodiment is performed by the first differential amplifying circuit. In the first through the third embodiments, the functions of the two differential amplifying circuits are to determine, through the photodiode, a highly accurate short-circuit current commensurate with the brightness of a photographic object, thereby obtaining as an output a voltage proportional to the logarithmic value of the aforesaid current. However, the function of the second differential amplifying circuit in the third embodiment is to convert the output impedance of the first differential amplifying circuit into a high output impedance, thereby imparting a signal voltage of the brightness of a photographic object to the sliding element of a potentiometer adjusted to represent the film sensitivity. In the fourth embodiment as shown in FIG. 4, the functions of the aforesaid first and second differential amplifying circuits are combined and performed by a single differential amplifying circuit.

In FIG. 4, the output from the differential amplifying circuit is taken from the collector of transistor 16 and provided to the base of transistor 301 as an input. Connected to the emitter of transistor 301 at junction 302 are potentiometers 312, 313 which respectively are set to provide film sensitivity and diaphragm aperture settings. Potentiometers 312, 313 are connected to the collector of transistor 310 and the collector of transistor 308 in a current source circuit consisting of transistors 308, 310, 315 for generating current proportional to the absolute temperature, variable resistors 316, 317 and resistors 318, 319. A circuit consisting of transistor 305 and variable resistor 306 as well as a circuit consisting of transistor 307 and variable resistor 309 are adapted to feed constant current to the respective collector circuits to which they are connected. The aforesaid constant currents should not necessarily be proportional to the absolute temperature.

Transistor 303 constitutes part of a negative feedback circuit of the differential amplifying circuit, while transistor 304 functions to off-set the variation in voltage, due to temperature, acorss the base-emitter of transistor 303, and the computed output is extracted from the emitter of transistor 304.

In operation, when the input potential at the gate of input field effect transistor 13 is raised, then the output potential at the collector of transistor 16 will be lowered, whereupon the potentials at the emitter of transistor 301 and the emitter of transistor 303 will be both lowered. When the potential at junction 320 is lowered in this manner, then the potential at input 23 will be lowered through logarithmic compressing diode 12. In this case, since input 23 receives a negative feedback signal it is maintained at the potential of ground 26, and then short-circuiting current will flow through photodiode 11. Accordingly, there will be produced at junction 320 a voltage proportional to the logarithmic value of the brightness.

Sliding element 311 may be directly connected to logarithmic compressing diode 12, rather than forming part of a constant current circuit consisting of transistors 303, 305 and variable resistor 306, although there will be required no constant current circuit consisting of transistor 307, transistor 304 and variable resistor 309. However, the current flowing through potentiometer 312 should be sufficiently high, as compared with the photoelectric current flowing through compressing diode 12. For instance, photoelectric current flowing through compressing diode 12 will be in the order of 5 $\mu$A for a photographic object of a high brightness. To avoid errors in computation due to this photoelectric current, current to be provided to potentiometer 312 should be several tens times as high as the aforesaid value, for instance 250 μA. Such a high ampere current should not be required from electric power source 49. For this reason, with the fourth embodiment shown in FIG. 4, sliding element 311 is connected via transistor 303 to a logarithmic compressing diode, thereby reducing the collector current of transistor 305 to several times as high as that of the aforesaid photoelectric current, for example 20 μA.

However, assuming that the base current of transistor 303 is $I_B$, then $$I_B = \frac{I_E}{h_{FE}},$$

wherein $I_E$ represents the emitter-collector current of transistor 303 and $h_{FE}$ is amplification factor of transistor 303. The value of $h_{FE}$ of an ordinary transistor is about 100, while $I_B$ is about several tens times that of the photoelectric current. Accordingly, current to be provided through potentiometer 312 may be set to a low value, thereby reducing the power source battery 49 to about one tenth that which would otherwise be required.

The potential at sliding element 311 will be the sum of the potential at junction 320 and the voltage across the base-emitter of transistor 303. However, the aforesaid base-emitter voltage will be off-set by the voltage across the base-emitter of transistor 304, and thus it will not appear as an output.

The computing method in the aforesaid circuit is the same as shown in FIG. 3 referring to the third embodiment, and hence the description thereof will be omitted.

Transistor 304, as has been described earlier, off-sets the voltage across the base-emitter of transistor 303, although the output impedance of transistor 304 may be further reduced, thereby satisfactorily feeding current to storage capacitor 41, thus reducing the charging time thereof.

Assuming that output terminal 322 of the operational circuit from the emitter of transistor 304 is directly connected to sliding element 314 of potentiometer 313 and omitting transistor 304, the charging current to storage capacitor 41 will flow through the resistance of potentiometer 314. Accordingly, in case the brightness of the light incident on photodiode 11 is abruptly increased, then the time constant according to the resistance of potentiometer 314 and storage capacitor 41 is increased, then the voltage of storage capacitor 41 will not follow sufficiently rapidly the light measuring output. For this reason, transistor 304 in the embodiments of the present invention constitutes a follower circuit which presents substantially a low output impedance, thereby solving the aforesaid problem.

To achieve improved responsiveness of the stored voltage without the provision of an emitter follower circuit using transistor 304, the resistance of potentiometer 313 should be lowered, while the current thereto should be increased. However, this will not save power from power source 49.

For adjustment of the operational output potential and the meter in this embodiment of the present invention, the technique given in the aforesaid respective embodiment may be used.

While the invention has been particularly shown and described with reference to peferred embodiments thereof, it will be understood by those skilled in the art that changes in form and details can be made therein without departing from the spirit and scope of the invention.

What is claimed is:

1. An automatic exposure time control device for a camera comprising:

a high input impedance differential amplifying circuit having first and second input terminals and an output terminal;

a photodiode connected between said first and second input terminals;

a logarithmic compressing diode connected from said output terminal to said first input terminal for providing negative feedback, whereby a voltage proportional to the logarithm of the light intensity detected by said photodiode is produced between said output terminal and said second input terminal;

an electrical element having two terminals one of which is connected to said output terminal, the resistance between said two terminals of the electrical element being variable in accordance with at least film sensitivity;

means for feeding said electrical element with a current, which is constant at a given temperature, in a direction so as to increase the level of the other terminal of the electrical element from that of said second input terminal of the differential amplifying circuit;

means including a capacitor for storing a voltage proportional to the voltage between said second input terminal of the differential amplifying circuit and said other terminal of said electrical element;

an antilogarithmic converting circuit including a transistor having an emitter, a collector and a base for generating a collector current proportional to the antilogarithm of the base-emitter voltage, said capacitor being connected between said base and emitter; and means for integrating said collector current to control the exposure time.

2. A device as in claim 1, wherein said means for feeding comprises means for making said current proportional to the absolute temperature.

3. A device as in claim 2, wherein said electrical element includes a potentiometer having a first end connected to said means for feeding, a second end is said one terminal of the electrical element and a slidable third end is said other terminal of the electrical element.

4. A device as in claim 2, wherein said electrical element includes a first potentiometer having a first end connected to said means for feeding, a second end and a slidable third end, said third end is said other terminal of the electrical element and slidable in accordance with film sensitivity, and a second potentiometer having a first end connected to said second end of the first potentiometer, a second end of said second potentiomer is said one terminal of the electrical element and a slidable third end is connected to said second end of said second potentiometer and slidable in accordance with the camera aperture setting.

5. A device as in claim 4 further comprising means for variably converting the voltage between the second input terminal of said differential amplifying circuit and the other terminal of said electric element into a voltage proportional thereto, said latter voltage is stored by said capacitor.

6. A device as in claim 5, wherein said converting means comprises a second transistor having an emitter, a collector and a base, said base being connected to said other terminal of the electrical element, a variable resistance connected at one end thereof to said emitter of the second transistor, said capacitor being connected between the other end of said variable resistance and said second input terminal of the differential amplifying circuit, and second means for feeding said variable resistance through the emittercollector of said second transistor with a current proportional to the absolute temperature; and further comprising a third transistor having its emitter and collector connected between said first and second potentiometer and its base connected to the first end of said first potentiometer.

* * * * *